US012681971B2

(12) United States Patent
Kim et al.

(10) Patent No.: US 12,681,971 B2
(45) Date of Patent: Jul. 14, 2026

(54) SEARCH USING MULTIPLE VECTOR SPACES

(71) Applicant: SAMSUNG ELECTRONICS CO., LTD., Suwon-si (KR)

(72) Inventors: Soofeel Kim, Suwon-si (KR); Jina Ham, Suwon-si (KR); Jaehyung An, Suwon-si (KR); Wonjong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/204,676

(22) Filed: Jun. 1, 2023

(65) Prior Publication Data

US 2023/0315771 A1 Oct. 5, 2023

Related U.S. Application Data

(63) Continuation of application No. PCT/KR2022/021616, filed on Dec. 29, 2022.

(30) Foreign Application Priority Data

Dec. 30, 2021 (KR) ........................ 10-2021-0193345

(51) Int. Cl.
G06F 16/334 (2025.01)
G06F 16/3329 (2025.01)
(Continued)

(52) U.S. Cl.
CPC ...... G06F 16/3347 (2019.01); G06F 16/3329 (2019.01); G06F 40/279 (2020.01); G06N 3/045 (2023.01)

(58) Field of Classification Search
CPC ............. G06F 16/3347; G06F 16/3329; G06F 16/3334; G06F 40/279; G06N 3/045;
(Continued)

(56) References Cited

U.S. PATENT DOCUMENTS 8,825,471 B2 * 9/2014 Betz ........................ G06F 16/93
707/706
10,037,360 B2 * 7/2018 Venkataraman ...... G06F 40/106
(Continued)

FOREIGN PATENT DOCUMENTS

CN 108334605 A * 7/2018 ............. G06F 16/35
CN 110442332 A * 11/2019 ......... G06F 16/3347
(Continued)

OTHER PUBLICATIONS

Ruiz, M.E., Srinivasan, P. Hierarchical Text Categorization Using Neural Networks. Information Retrieval 5, 87-118 (2002). https://doi.org/10.1023/A:1012782908347 (Year: 2002).*
(Continued)

*Primary Examiner* — Neveen Abel Jalil
*Assistant Examiner* — Hubert Cheung
(74) *Attorney, Agent, or Firm* — Sughrue Mion, PLLC

(57) ABSTRACT

An electronic apparatus is disclosed. The electronic apparatus includes a memory configured to store a plurality of searchable texts and a plurality of neural network models, and a processor. The processor is configured to identify a first entity among words included in an input text by inputting the input text into a first neural network model, acquire at least one text among the searchable texts which is positioned adjacent to the identified first entity on a first vector space by inputting the identified first entity into a second neural network model, identify at least one text among the acquired texts which is positioned adjacent to the input text on a second vector space, and output a search result based on the identified text.

14 Claims, 11 Drawing Sheets

(51) Int. Cl.
_G06F 40/279_ (2020.01)
_G06N 3/045_ (2023.01)
(58) Field of Classification Search
CPC ...... G06N 3/088; G06N 3/044; G06N 3/0464;
G06N 3/08
See application file for complete search history.

(56) References Cited

U.S. PATENT DOCUMENTS

| | | | |
|---|---|---|---|
| 10,585,942 B2 | 3/2020 | Ramer et al. | |
| 11,455,542 B2 * | 9/2022 | Feng | G06N 20/00 |
| 2012/0323968 A1 * | 12/2012 | Yih | G06F 16/31 |
| | | | 707/E17.069 |
| 2015/0046152 A1 * | 2/2015 | Lee | G06F 16/35 |
| | | | 704/9 |
| 2019/0018838 A1 * | 1/2019 | Wu | G06N 3/0499 |
| 2019/0220749 A1 * | 7/2019 | Feng | G06N 3/088 |
| 2019/0377793 A1 * | 12/2019 | Li | G06F 40/242 |
| 2020/0226126 A1 * | 7/2020 | Zou | G06N 3/084 |
| 2020/0372341 A1 * | 11/2020 | Asai | G06N 3/045 |
| 2021/0065705 A1 | 3/2021 | Ham et al. | |
| 2021/0224286 A1 * | 7/2021 | Wu | G06F 16/24578 |
| 2021/0256051 A1 * | 8/2021 | Wang | G06F 16/45 |
| 2022/0121692 A1 * | 4/2022 | Jizhou | G06F 16/29 |
| 2022/0141160 A1 * | 5/2022 | Ham | H04L 51/214 |
| | | | 709/206 |
| 2022/0215276 A1 | 7/2022 | Lee et al. | |
| 2022/0245340 A1 * | 8/2022 | Yang | G06F 40/279 |
| 2022/0245364 A1 * | 8/2022 | Lee | G06F 3/165 |
| 2022/0247822 A1 * | 8/2022 | Kim | H04L 67/535 |
| 2023/0088411 A1 * | 3/2023 | Chiu | G06F 16/35 |
| | | | 704/9 |

FOREIGN PATENT DOCUMENTS

| | | | | | |
|---|---|---|---|---|---|
| CN | 110472018 | A | * | 11/2019 | |
| CN | 110543635 | A | * | 12/2019 | G06F 16/3329 |
| CN | 107291822 | B | * | 3/2020 | G06F 16/35 |
| CN | 112131379 | A | * | 12/2020 | G06F 18/2411 |
| CN | 112131380 | A | * | 12/2020 | G06Q 50/26 |
| CN | 112364659 | A | * | 2/2021 | G06F 40/295 |
| CN | 112527972 | A | * | 3/2021 | G06F 18/22 |
| CN | 112765976 | A | | 5/2021 | |
| CN | 113190011 | A | * | 7/2021 | |
| CN | 113408273 | A | * | 9/2021 | |
| CN | 108376144 | B | * | 10/2021 | G06F 18/22 |
| CN | 112732862 | B | * | 11/2021 | G06F 16/3344 |
| CN | 113590789 | A | * | 11/2021 | G06F 16/3329 |
| CN | 113590829 | A | * | 11/2021 | |
| CN | 113918703 | A | * | 1/2022 | G06F 40/295 |
| EP | 3882806 | A1 | * | 9/2021 | G06F 16/33 |
| EP | 4134872 | A1 | * | 2/2023 | G06N 3/044 |
| KR | 10-0885527 | B1 | | 2/2009 | |
| KR | 10-1788682 | B1 | | 10/2017 | |
| KR | 10-2019-0019041 | A | | 2/2019 | |
| KR | 10-2019-0094078 | A | | 8/2019 | |
| KR | 10-2021-0024861 | A | | 3/2021 | |
| KR | 10-2021-0067372 | A | | 6/2021 | |
| WO | 2021-107330 | A1 | | 6/2021 | |

OTHER PUBLICATIONS

International Search Report (PCT/ISA/210) issued Apr. 7, 2023 by the International Searching authority in counterpart International Patent Application No. PCT/KR2022/021616.
Communication dated Nov. 11, 2024, issued by the European Patent Office for European Patent Application No. 22916801.8.

* cited by examiner

FIG. 11

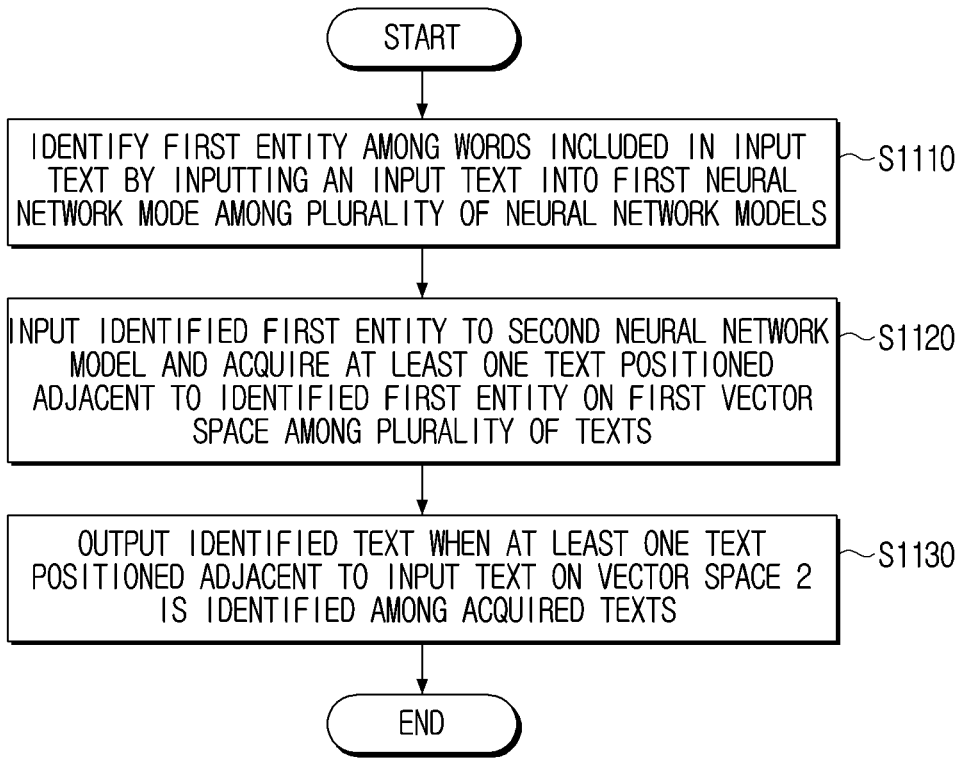

START

IDENTIFY FIRST ENTITY AMONG WORDS INCLUDED IN INPUT
TEXT BY INPUTTING AN INPUT TEXT INTO FIRST NEURAL
NETWORK MODE AMONG PLURALITY OF NEURAL NETWORK MODELS
~S1110

INPUT IDENTIFIED FIRST ENTITY TO SECOND NEURAL NETWORK
MODEL AND ACQUIRE AT LEAST ONE TEXT POSITIONED
ADJACENT TO IDENTIFIED FIRST ENTITY ON FIRST VECTOR
SPACE AMONG PLURALITY OF TEXTS
~S1120

OUTPUT IDENTIFIED TEXT WHEN AT LEAST ONE TEXT
POSITIONED ADJACENT TO INPUT TEXT ON VECTOR SPACE 2
IS IDENTIFIED AMONG ACQUIRED TEXTS
~S1130

END

SEARCH USING MULTIPLE VECTOR SPACES

CROSS-REFERENCE TO RELATED APPLICATION(S)

This application is a bypass continuation of International Application No. PCT/KR2022/021616, filed on Dec. 29, 2022, which is based on and claims priority to Korean Patent Application No. 10-2021-0193345, filed on Dec. 30, 2021, in the Korean Intellectual Property Office, the disclosures of which are incorporated by reference herein in their entireties.

BACKGROUND

1. Field

The disclosure relates to an electronic apparatus and a method for controlling thereof. More particularly, the disclosure relates to an electronic apparatus for analyzing text and method for controlling thereof.

2. Description of Related Art

With the development of electronic technology, various types of electronic apparatuses have been developed and distributed. This has resulted in diversification not only of types of electronic apparatuses, but also their functions and operations.

In particular, there has always been a demand to increase accuracy of search results by an electronic apparatus according to the desired results of the user. For example, an exact match-based search might have high accuracy, but also has problems in that results which are non-exact but similar to the search terms are not provided, sometimes no results are found, or the like. In an alternative approach, a prior vector similarity-based search may provide search results having a similar context to the search terms without being an exact match, but is less accurate.

Accordingly, there has been a demand for a search method that provides search results reflecting a user's search intention, which are also similar to the search terms and of high accuracy.

SUMMARY

The disclosure has been made in accordance with the above necessity, and an object of the disclosure is to provide an electronic apparatus for performing a search in view of an entity of an input text, and a method for control thereof.

Additional aspects will be set forth in part in the description which follows and, in part, will be apparent from the description, or may be learned by practice of the presented embodiments.

According to an embodiment of the disclosure, an electronic apparatus for performing a search includes a memory configured to store a plurality of searchable texts and a plurality of neural network models, and a processor. The plurality of neural network models includes a first neural network model and a second neural network model. The processor is configured to identify a first entity among words included in input text by inputting the input text into the first neural network model. The processor is further configured to position the identified first entity on a first vector space by inputting the identified first entity into the second neural network model. The processor is further configured to acquire at least one text, among the plurality of searchable texts, which is positioned adjacent to the identified first entity on the first vector space. The processor is further configured to identify at least one text, among the at least one acquired text, which is positioned adjacent to the input text on a second vector space. The processor is further configured to output a search result based on the at least one identified text.

According to another embodiment of the disclosure, a method of controlling an electronic apparatus for performing a search, the apparatus including a plurality of texts, includes identifying a first entity among words included in input text by inputting input text into a first neural network model. The method further includes positioning the identified first entity on a first vector space by inputting the identified first entity into a second neural network model. The method further includes acquiring at least one text, among the plurality of searchable texts, which is positioned adjacent to the identified first entity on the first vector space. The method further includes identifying at least one text, among the at least one acquired text, which is positioned adjacent to the input text on a second vector space. The method further includes outputting a search result based on the at least one identified text.

As described above, according to various embodiments of the disclosure, a search result that meets a search intention and has high accuracy may be provided to a user. In addition, an efficiency of a search resource in performing a search may also be improved.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a flowchart illustrating a method of controlling an electronic apparatus, according to an embodiment of the disclosure.

DETAILED DESCRIPTION

Hereinafter, the disclosure will be described in detail with reference to the accompanying drawings.

Terms used in the disclosure are selected as general terminologies currently widely used in consideration of configurations and functions of the one or more embodiments of the disclosure, but can be different depending on intention of those skilled in the art, a precedent, appearance of new technologies, or the like. Further, in specific cases, terms may be arbitrarily selected. In that configuration, the meaning of the terms will be described in the description of the corresponding embodiments. Accordingly, the terms used in the description should not necessarily be construed as simple names of the terms, but be defined based on meanings of the terms and overall contents of the disclosure.

The terms "have", "may have", "include", and "may include" used in the exemplary embodiments of the disclosure indicate the presence of corresponding features (for example, elements such as numerical values, functions, operations, or parts), and do not preclude the presence of additional features.

The term "at least one of A or/and B" means including at least one A, including at least one B, or including both at least one A and at least one B.

The term such as "first" and "second" used in various exemplary embodiments may modify various elements regardless of an order and/or importance of the corresponding elements, and does not limit the corresponding elements.

When an element (e.g., a first element) is "operatively or communicatively coupled with/to" or "connected to" another element (e.g., a second element), an element may be directly coupled with another element or may be coupled through the other element (e.g., a third element).

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

Also, the term "user" may refer to a person who uses an electronic apparatus or an apparatus (e.g., an artificial intelligence (AI) electronic apparatus) that uses the electronic apparatus.

Hereinafter, various embodiments of the disclosure will be described in more detail with reference to the accompanying drawings.

Figure 1:
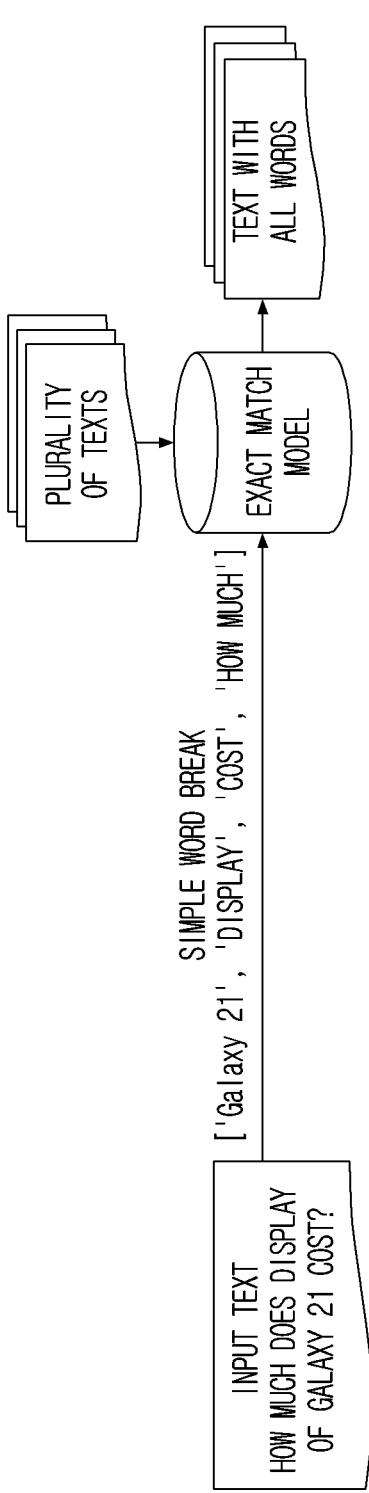
FIG. 1 is a view illustrating a configuration of searching for text related to input text, according to an embodiment of the related art.

FIG. 1 is a view illustrating a configuration of searching for text related to input text, according to an embodiment of the related art.

Referring to FIG. 1, when a text is input, the electronic apparatus according to an embodiment may search for (or identify) a text related to the input text among a plurality of texts and provide the identified text. This plurality of texts may be termed "searchable texts" for convenience.

The input text and each of the plurality of searchable texts may each be a sentence. The input text may be in a form of a question input by the user, but is not limited thereto. One or more of the plurality of searchable texts may include a sentence in a form of a question, or the form of an answer to a question. The plurality of searchable texts may also include documents in which a sentence in a form of a question and a sentence in the form of an answer to the corresponding question are paired (or in a mapping relation).

Referring to FIG. 1, an electronic apparatus may identify each of a plurality of words included in an input text by analyzing the input text. For example, the electronic apparatus may identify 'Galaxy 21', 'display', 'cost', and 'how much?' by breaking the input text 'How much does a display of Galaxy 21 cost?' into words or word units. For example, the electronic apparatus may identify a plurality of words included in the input text using a natural language understanding (NLU) module.

It is noted that some "word units" contain more than one word, and are a grouping of words having a unitary meaning; that is, the individual words would be interpreted to have a distinctly different meaning than intended without the context of the entire word unit. "How many", "red panda", "New York City", "three hundred and fifty dollars", and "Galaxy 21" are examples of word units which include a plurality of words. Unless explicitly stated otherwise, the features and processes discussed herein, both in the disclosed apparatus and method and in the related art, evaluate and process a "word unit" in the same manner regardless of the number of literal words contained within. Therefore, for reasons of brevity, going forward this disclosure will use the term "word" to refer to word units, whether containing single words or a plurality of words, with the distinction between the two noted only when relevant.

The electronic apparatus may acquire a text related to the input text from among the plurality of texts by inputting the plurality of identified words into a neural network model.

Referring to FIG. 1, the neural network model may be an exact match model. Since an exact match model identifies only texts containing all of the identified plurality of words (e.g., 'Galaxy 21', 'display', 'cost', 'how much?') among a plurality of texts, there is a problem in that the number of identifiable texts is reduced, and texts including synonyms for words in the input text (e.g., 'price', etc. which is a synonym for 'cost') cannot be identified. For example, since, among the plurality of texts, 'What is the price of a screen replacement for Galaxy 21?' or 'The screen replacement of Galaxy 21 is 150,000 won', etc. do not include all of the terms 'Galaxy 21', 'display', 'cost', 'how much', the exact match model cannot identify these texts, even though they are related to the input text.

Figure 2:
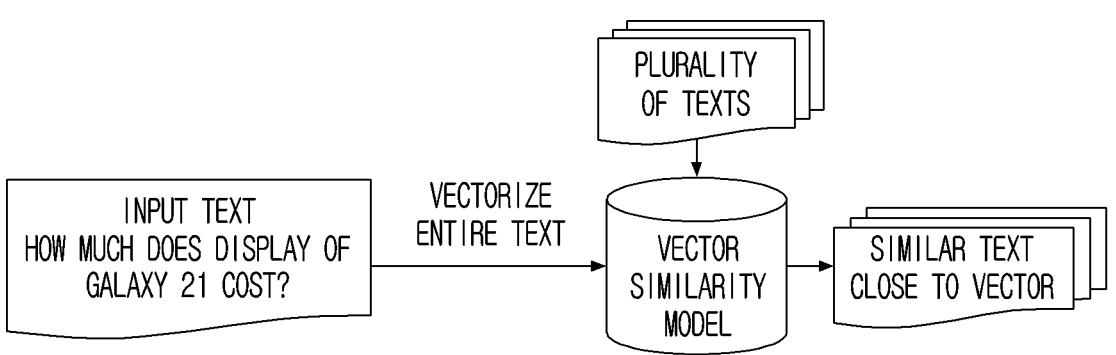
FIG. 2 is a view illustrating a configuration of searching for text related to input text, according to another embodiment of the related art.

FIG. 2 is a view illustrating a configuration of searching for text related to input text, according to another embodiment of the related art.

Referring to FIG. 2, when a text is input, the electronic apparatus according to another embodiment may search for (or identify) a text related to the input text among a plurality of texts and provide the identified text.

Referring to FIG. 2, the electronic apparatus may acquire a text related to the input text from among a plurality of texts by inputting the input text into a neural network model. The neural network model may be a vector similarity model, unlike the exact match model described with reference to FIG. 1.

The vector similarity model according to an embodiment may position each of a plurality of texts on a vector space, and after representing the input text as a vector, identify a text positioned adjacent to the input text on the vector space among the plurality of texts.

The vector similarity model according to an embodiment may convert an entire text into a vector, position the converted text on a vector space, and identify text positioned adjacent to the input text on the vector space. Thus the model may more easily identify, compared to the exact match model, text having a similar context to the input text without being an exact match.

However, the results may also be less accurate. For example, the vector similarity model may identify 'How much does a battery of Galaxy 21 cost?' or 'The screen replacement price of the Galaxy Note 10 is 100,000 won' using the text adjacent to the input text 'How much does a display of the Galaxy 21 cost?'. However, the user's search intention according to the input text is 'the price required to replace the display of the Galaxy 21'. 'How much does a battery of the Galaxy 21 cost?' is similar only in that it is a question for the same model (e.g., Galaxy 21) among the texts identified by the vector similarity model, and 'The screen replacement cost of Galaxy Note 10 is 100,000 won' is similar only in that it is a question about the same parts (e.g., screen, display). Neither result refers to the user's search intention.

Hereinafter, a search method that conforms to the user's search intention and improves an accuracy of a search result provided by an electronic apparatus will be described through various embodiments of the disclosure.

Figure 3:
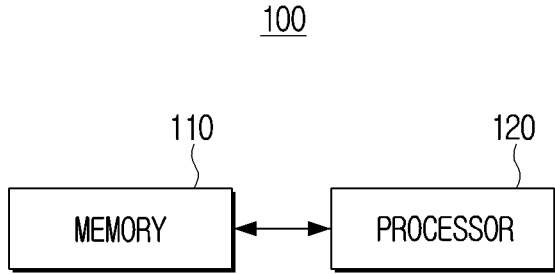
FIG. 3 is a block diagram illustrating a configuration of an electronic apparatus, according to an embodiment of the disclosure.

FIG. 3 is a block diagram illustrating a configuration of an electronic apparatus, according to an embodiment of the disclosure.

Referring to FIG. 3, the electronic apparatus 100 includes a memory 110 and a processor 120.

The memory 110 according to an embodiment may include (for example, may store) a plurality of texts. As described above, a plurality of texts may include a sentence belonging to a question category, a sentence belonging to an answer category, or documents in which a sentence in a form of a question and a sentence in a form of an answer to the corresponding question are paired (or in a mapping relation).

Each of the plurality of texts may be pre-stored in the memory 110, or may be stored in the memory 110 after the electronic apparatus 100 communicates with an external device (e.g., a server, etc.) and receives it.

The memory 110 according to an embodiment of the disclosure may additionally store a plurality of neural network models. Features of each of the plurality of neural network models will be described below.

The processor 120 according to an embodiment may control the overall operation of the electronic apparatus 100.

According to an embodiment, the processor 120 may be implemented as a digital signal processor (DSP), a microprocessor, an artificial intelligence (AI), or a timing controller (T-CON) that processes a digital image signal, but is not limited thereto. The processor 120 may include one or more of a central processing unit (CPU), microcontroller unit (MCU), micro processing unit (MPU), controller, application processor (AP), or communication processor (CP), ARM processor, or may be defined with a corresponding term. In addition, the processor 120 may be implemented as a system on chip (SoC), a large scale integration (LSI) with a built-in processing algorithm, or a field programmable gate array (FPGA).

Particularly, the processor 120 may be configured to input an input text into a first neural network model among a plurality of neural network models to identify a first entity among words included in the input text.

The processor 120 may acquire at least one text positioned adjacent to the first entity on a first vector space among the plurality of texts by inputting the first entity into a second neural network model.

When at least one text positioned adjacent to the input text on a second vector space is identified among the acquired texts, the processor 120 may acquire and output the identified text as a search result. The search result may also be based on the identified text; it may, for example, be formatted, abbreviated, or edited prior to being output, or it may be used to reference other corresponding text or data, such as a text in a mapping relationship with the identified text, which may be outputted instead of or in addition to the identified text.

Figure 4:
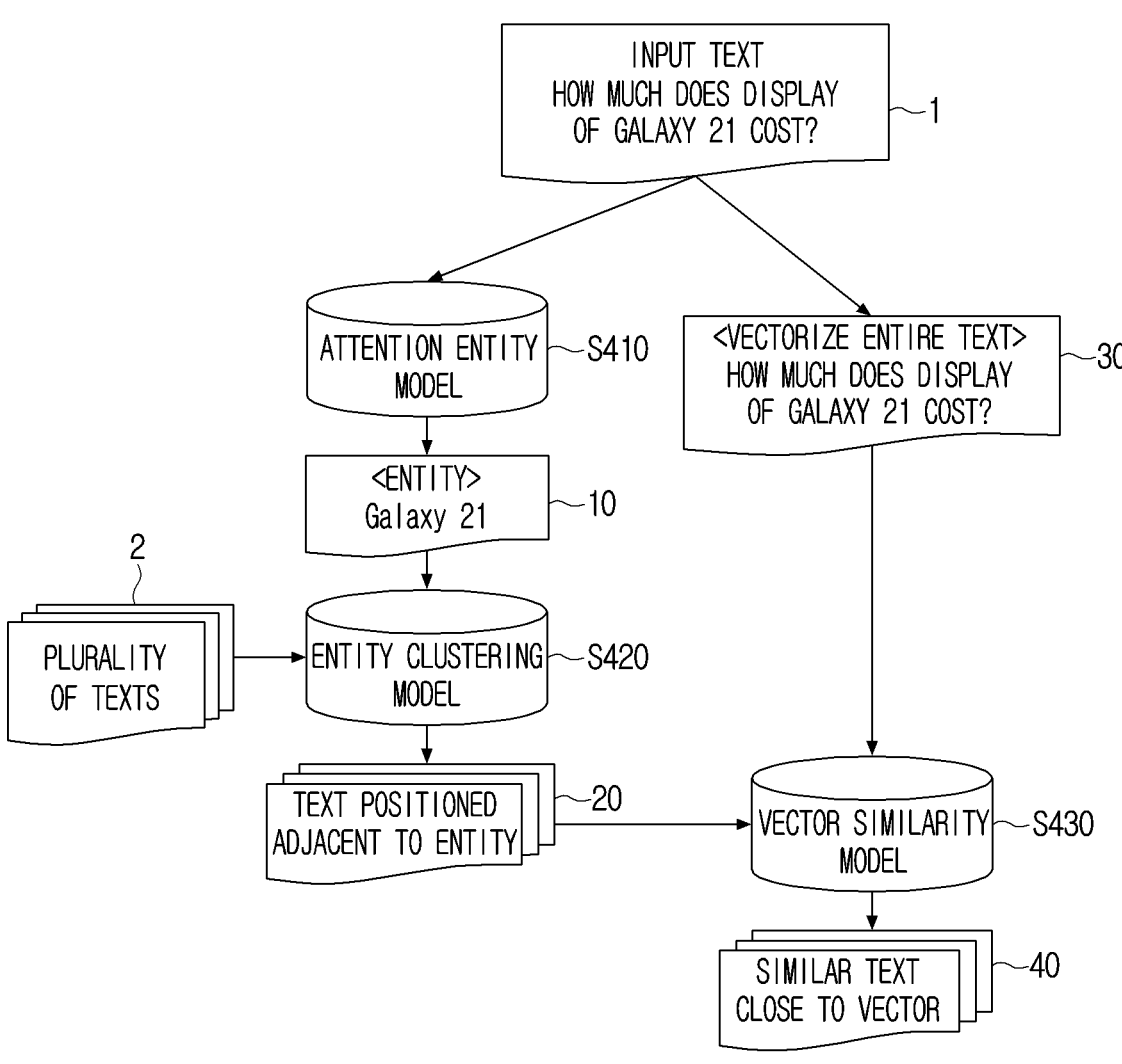
FIG. 4 is a view illustrating operations and interactions of a plurality of neural network models, according to an embodiment of the disclosure.

FIG. 4 is a view illustrating operations and interactions of a plurality of neural network models, according to an embodiment of the disclosure.

According to an embodiment, the processor 120 may input an input text 1 (e.g., 'How much does a display of Galaxy 21 cost?') to the first neural network model, and identify a first entity 10 (e.g., 'Galaxy 21') among words included in the input text 1 (at S410).

The first neural network model may be referred to as an attention entity model. According to an embodiment, the attention entity model may acquire an attention weight corresponding to each of the plurality of words included in the input text 1. The attention entity model may give different weights (or different ratios) to each of the plurality of words included in the input text 1, and may be trained to give a large weight (that is, a weight having a large value) to at least one text corresponding to a search intention according to the input text. A word to which the attention entity model has applied a larger weight relative to the weights of a plurality of words of the input text 1 (for example, the largest weight of the weights of the plurality of words) may be labeled as an entity (hereinafter, referred to as a first entity) which corresponds to the input text 1.

The processor 120 may identify at least one searchable text, among the plurality of searchable texts, positioned adjacent to the first entity on a first vector space by inputting the first entity into a second neural network model (at S420).

The second neural network model may be referred to as an entity clustering model. According to an embodiment, the entity clustering model may identify an entity (hereinafter, referred to as a second entity) corresponding to each of a plurality of searchable texts 2. These entities may have been previous labeled as the entities respectively corresponding to each of the searchable texts 2, by providing each of the searchable texts 2 to the attention entity model, which then weighted the words of each of the searchable texts 2 in the same manner as the input text 1. The entity clustering model may position the plurality of second entities on a first vector space.

The entity clustering model may identify at least one second entity positioned adjacent to the first entity 10 from among the plurality of second entities positioned on the first vector space. Specifically, the entity clustering model may identify at least one second entity adjacent to the first entity by comparing a first position of the first entity with a second position corresponding to each of the plurality of second entities on the first vector space.

For example, if the first entity 10 is 'Galaxy 21', the entity clustering model may identify at least one second entity (e.g., 'Galaxy', 'Galaxy twenty-one', 'Galaxy S 21', 'Galaxy 21', 'Samsung S 21', etc.) positioned adjacent to the first entity 10 on the first vector space.

The entity clustering model may acquire at least one searchable text 20 corresponding to the identified second entity from among the plurality of searchable texts 2. Such a text may be termed an "acquired text" 20 for convenience.

The processor 120 according to an embodiment of the disclosure may acquire a vector value 30 corresponding to the input text 1, based on the entire input text 1. Such a vector value may be termed an "input vector value" 30 for convenience.

The processor 120 may identify at least one searchable text 40 positioned adjacent to the input text 1 from among the at least one acquired text 20.

For example, the processor 120 may position each acquired text 20 on the second vector space, and may input the input vector value 30 into a third neural network model. The processor 120 may then identify at least one searchable text 40 (or text having a similar vector), among the at least one acquired text 20, which is positioned adjacent to the input vector value 30 in the second vector space (at S430). Such a text may be termed an "identified text" 40 for convenience.

The third neural network model may be referred to as a vector similarity model. According to an embodiment, instead of positioning each of the plurality of searchable texts 2 on a second vector space, the vector similarity model may simply position each acquired text 20, and may identify at least one text 40 among the at least one acquired text 20 which is positioned adjacent to the input vector value 30. This identified text 40 may be then output as a search result, or a search result may be otherwise based thereon as described previously.

According to an embodiment, text to be searched by the vector similarity model on the second vector space is limited to the at least one acquired text 20, rather than all of the plurality of searchable texts 2, and thus search resources of the electronic apparatus 100 may be efficiently managed. Additionally, the electronic apparatus 100 may identify the at least one text 40 having a similar vector value among the at least one acquired text 20 corresponding to the entity (i.e., the second entity) which is adjacent to an entity (i.e., the first entity), to which a relatively larger weight is applied using the attention entity model and the entity clustering model, thereby providing a search result corresponding with search intention.

Hereinafter, a method for training first, second, and third neural network models and assembling a plurality of searchable texts will be described.

Figure 5:
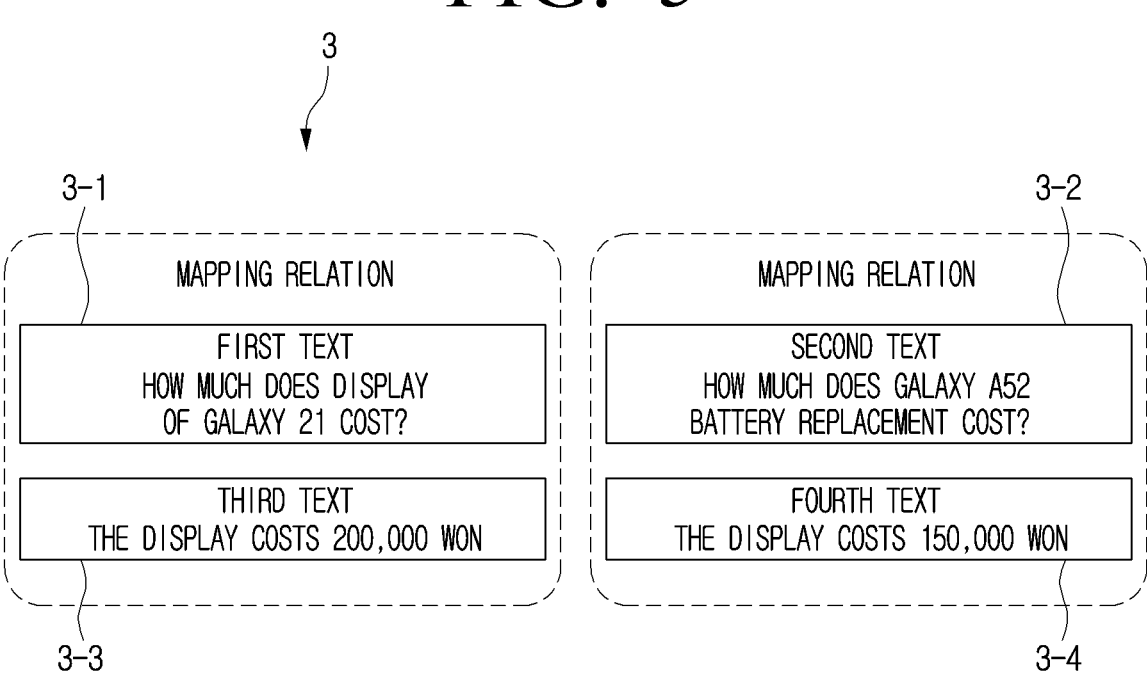
FIG. 5 is a view illustrating examples of mapping relations between texts, according to an embodiment of the disclosure.

FIG. 5 is a view illustrating examples of mapping relations between texts, according to an embodiment of the disclosure.

Referring to FIG. 5, a first training text 3-1 and a second training text 3-2 among a plurality of training texts 3 may each be a text in a form of a sentence belonging to a question category.

In addition, a third training text 3-3 and a fourth training text 3-4 among the plurality of training texts 3 may each be a text in a form of a sentence belonging to an answer category.

The first training text 3-1 (e.g., 'How much does a display of Galaxy 21 cost?') and the third training text 3-3 (e.g., 'The display costs 200,000 won) may have a mapping relation of a question-answer relationship. As another example, the second training text 3-2 (e.g., 'What is a display replacement cost of Galaxy A52?') and the fourth training text 3-4 (e.g., 'The display costs 150,000 won') may have a mapping relation of a question-answer relationship.

The text in the form of a sentence belonging to the question category and the text in the form of a sentence belonging to the answer category are only examples of texts and text categories. At least some of the texts in the plurality of training texts 3 may be in a form other than that of a question or answer, and may be text of any of various other forms (e.g., manual (product instruction manual), etc.). It is also noted that the plurality of training texts 3 and the plurality of texts 2 shown in FIG. 4 may be the same or different.

The first neural network model (i.e., attention entity model) may be a model trained to identify at least one of the plurality of words included in the input text 1 as a first entity 10, such as previously described with reference to FIG. 4, by using the plurality of training texts 3 as training data. A detailed description thereof will be described with reference to FIG. 6.

Figure 6:
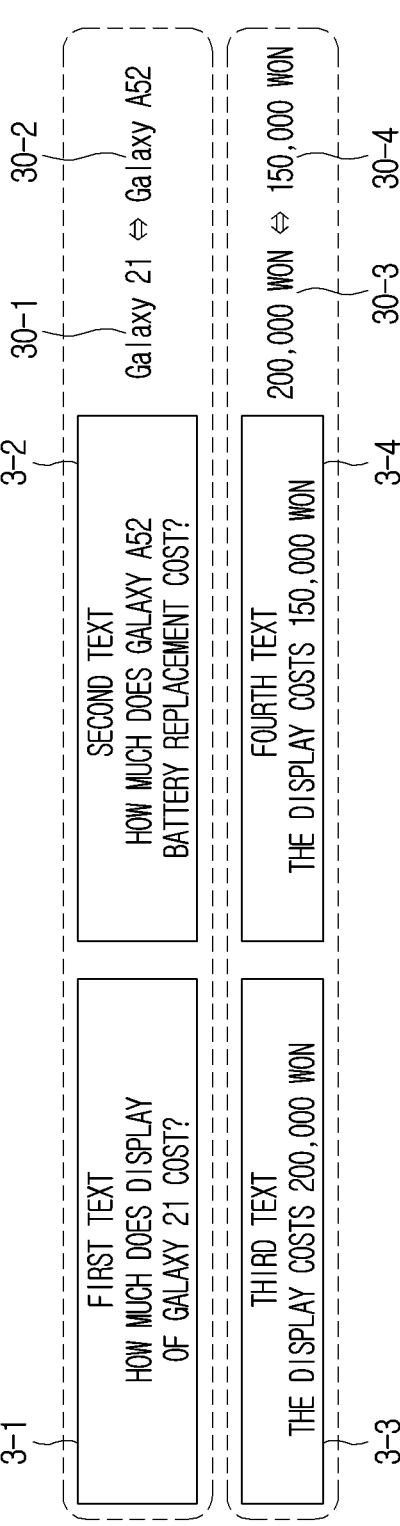
FIG. 6 is a view illustrating an example of an entity, according to an embodiment of the disclosure.

FIG. 6 is a view illustrating examples of an entity, according to an embodiment of the disclosure.

The attention entity model according to an embodiment of the disclosure may compare a first training text 3-1 and a second training text 3-2 belonging to the question category to identify the presence or absence of words having different meanings among the plurality of words included in the first training text 3-1 and the plurality of words included in the second training text 3-2.

For example, the attention entity model may identify that a first word 30-1 (e.g., 'Galaxy 21') from among the plurality of words included in the first training text 3-1 has a different meaning from a second training word 30-2 (e.g., 'Galaxy A52') from among the plurality of words included in the second training text 3-2.

The attention entity model may then consider a relationship of the first training text 3-1 with other training texts, and a similar relationship of the second training text 3-2 with other training texts, to determine how to weight the first word 30-1 and the second word 30-2.

For example, the attention entity model may determine that a third training text 3-3 has a question-answer relationship with the first training text 3-1, and may also determine that a fourth training text 3-4 has a question-answer relationship with the second training text 3-2. The attention entity model may then identify whether the third training text 3-3 and the fourth training text 3-4 have different meanings by a comparison similar to that of the first training text 3-1 and a second training text 3-2. For example, the third word 30-3 (e.g., 200,000 won) among the plurality of words included in the third training text 3-3 and the fourth word 30-4 (e.g., 150,000 won) among the plurality of words included in the fourth training text 3-4 have a different meaning. Thus, the attention entity model may identify that the third training text 3-3 and fourth training text 3-4 also have a different meaning.

When it is identified that the third training text 3-3 and the fourth training text 3-4 belonging to the answer category have different meanings, this means that the first training text 3-1 and the second training text 3-2 belonging to the question category have different corresponding answers. This in turn indicates that the difference between the first training text 3-1 and the second training text 3-2 is relevant. Therefore, the attention entity model may be trained such that a larger weight, relative to the weights of other words in each text, is applied to the first word 30-1 (e.g., 'Galaxy 21') and the second word 30-2 (e.g., 'Galaxy A52'), as these words are where the difference between the first training text 3-1 and the second training text 3-2 is found.

In other words, if the context of each of the plurality of training texts belonging to the question category is similar, but each has a mapping relation to a corresponding training text belonging to the answer category, and if it is identified that the respective corresponding training texts belonging to the answer category have different meanings, the attention entity model may be trained to identify, as entities, words having different meanings among the plurality of training texts belonging to the question category.

Referring back to FIG. 4, the identifying (at S410) of a first entity 10 corresponding to each of the plurality of texts, and the identifying (at S420) of at least one text positioned adjacent to the first entity 10 corresponding to the input text among the plurality of searchable texts 2 will be described in detail with reference to FIG. 7.

Figure 7:
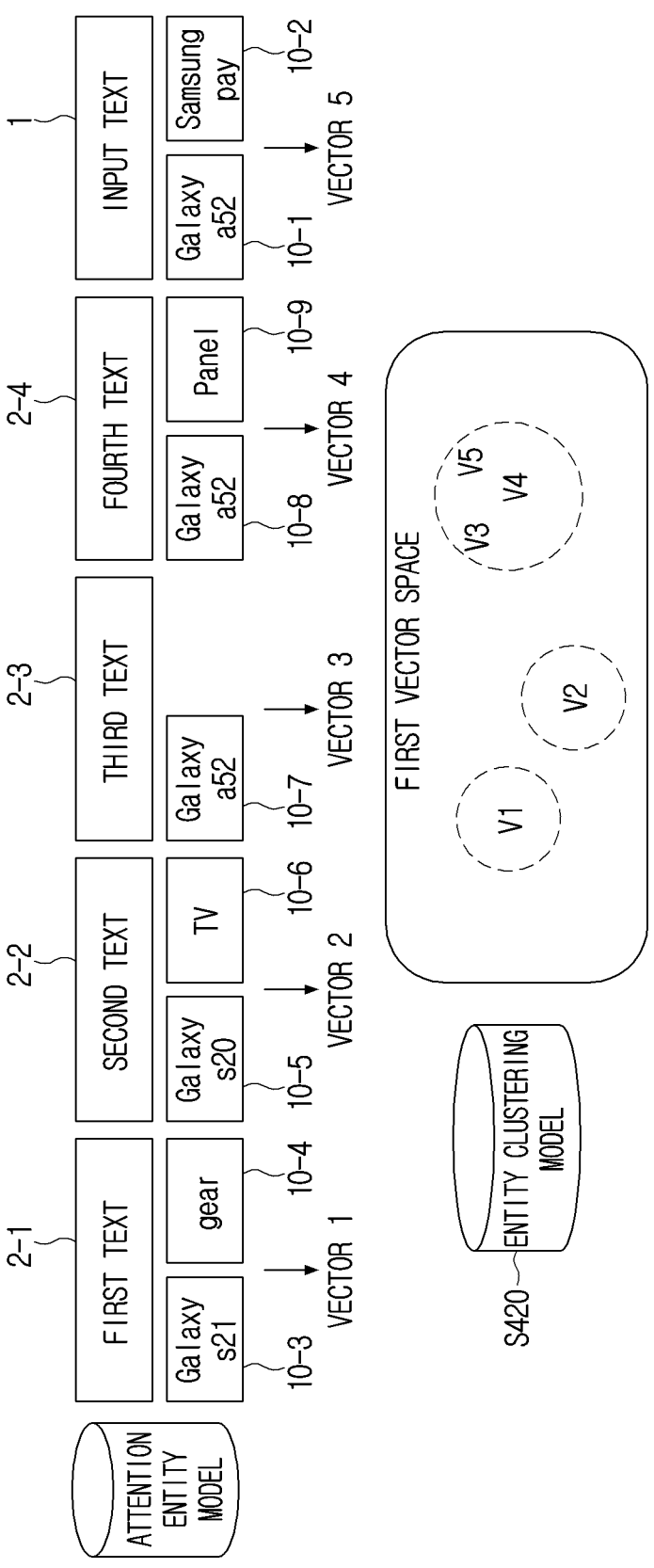
FIG. 7 is a view illustrating an example of an entity clustering model, according to an embodiment of the disclosure.

FIG. 7 is a view illustrating an example of an entity clustering model, according to an embodiment of the disclosure.

Referring to FIG. 7, the attention entity model may identify entities corresponding to each of the plurality of searchable texts 2 and the input text 1 after analyzing the words included in each of the plurality of searchable texts 2 and the input text 1.

For example, the attention entity model may identify at least one first entity (e.g., first entities 10-1 and 10-2: Galaxy A52, Samsung pay) to which a relatively high weight is applied among the plurality of words included in the input text 1.

In addition, the attention entity model may identify at least one second entity (e.g., second entities 10-3 and 10-4: Galaxy S21, Gear) to which a relatively high weight is applied among the plurality of words included in the first searchable text 2-1.

As shown in FIG. 7, the attention entity model may also acquire at least one second entity (e.g., second entities 10-5 and 10-6: Galaxy S20, TV) corresponding to a second text 2-2, at least one second entity (e.g., second entity 10-7: Galaxy A52) corresponding to a third text 2-3, and at least one second entity (e.g., second entities 10-8 and 10-9: Galaxy A52, Panel) corresponding to a fourth text 2-4.

In other words, the attention entity model may (at S410) identify an entity corresponding to each of the plurality of searchable texts 2 and the input text 1.

The entity clustering model may position a first entity 10-1 corresponding to the input text 1 and second entities 10-3, . . . , 10-$n$ corresponding to each of the plurality of searchable texts 2 on the first vector space.

Referring to FIG. 7, the first entity 10-1 is illustrated as V5 on the first vector space, the second entities 10-3 and 10-4 corresponding to the first text 2-1 are illustrated as V1 on the first vector space, the second entities 10-5 and 10-6 corresponding to the second text 2-2 are illustrated as V2 on the first vector space, the second entity 10-7 corresponding to the third text 2-3 is illustrated as V3 on the vector space, and the second entities 10-8 and 10-9 corresponding to the fourth text 2-4 are illustrated as V4 on the vector space.

Referring to FIG. 7, the entity clustering model may (at S420) identify the first entity 10-1 corresponding to the input text 1, that is, V5, and identify the third text 2-3 corresponding to V3 and the fourth text 2-4 corresponding to V4, which are positioned adjacent to V5.

Referring back to FIG. 4, when the entity clustering model identifies at least one acquired text 20 corresponding to a vector adjacent to a position of the vector of the first entity 10-1, the vector similarity model may (at S430)

identify at least one text 40 adjacent to the input text 1 on the vector space. Hereinafter, an operation of the vector similarity model of S430 will be described in detail with reference to FIG. 8.

Figure 8:
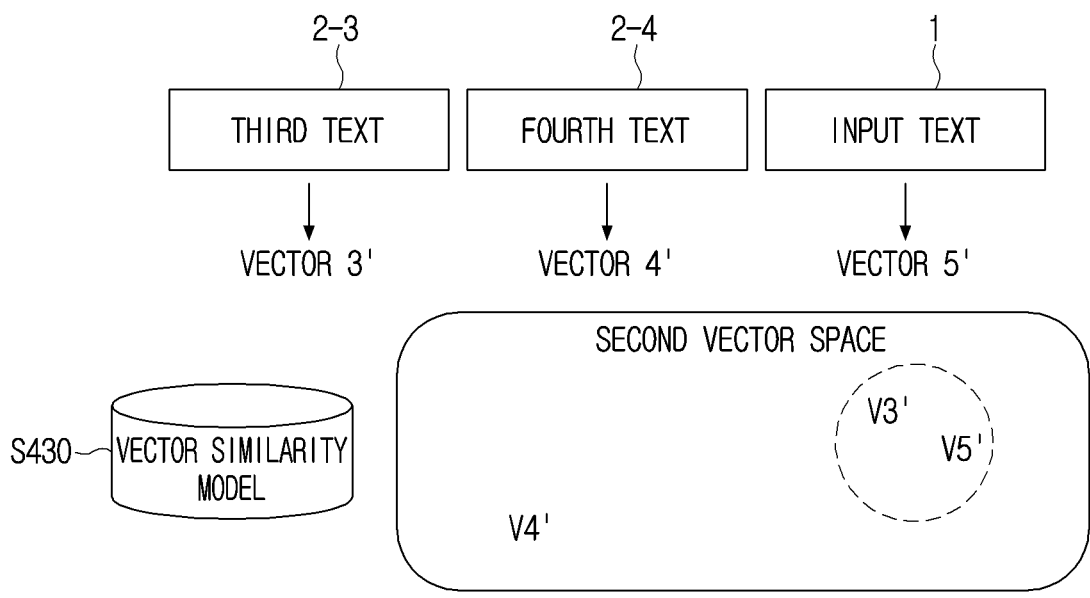
FIG. 8 is a view illustrating operations of a vector similarity model, according to an embodiment of the disclosure.

FIG. 8 is a view illustrating operations of a vector similarity model, according to an embodiment of the disclosure.

Referring to FIG. 8, the vector similarity model may convert the input text 1 into a vector (e.g., V5'), in whole text units, and position it on the second vector space.

In addition, the vector similarity model may convert at least one acquired text 20 (e.g., the third text 2-3 and the fourth text 2-4) identified using the entity clustering model (in the operation S420, such as discussed with reference to FIG. 7 above) into a vector (e.g., V3', V4') and position it on the second vector space.

The vector similarity model may acquire a vector (e.g., V3') positioned adjacent to vector V5' corresponding to the input text 1 on the second vector space.

The vector similarity model may then identify a text (e.g., third text 2-3) corresponding to the acquired vector (e.g., V3').

Additionally, if the input text 1 is text in the form of a sentence belonging to the question category, the processor 120 according to an embodiment of the disclosure may acquire a mapping relation of the text (e.g., third text 2-3) identified using the vector similarity model, and may output text in the form of sentences belonging to the answer category from the mapping relationship.

For example, if the input text 1 is 'How much does a battery of Galaxy A52 cost?', a text identified using the vector similarity model may be, for example, 'How much does a Galaxy A52 battery replacement cost?', and a text in a mapping relation with the identified text, which belongs to the answer category, may be 'It is 50,000 won.'

Figure 9:
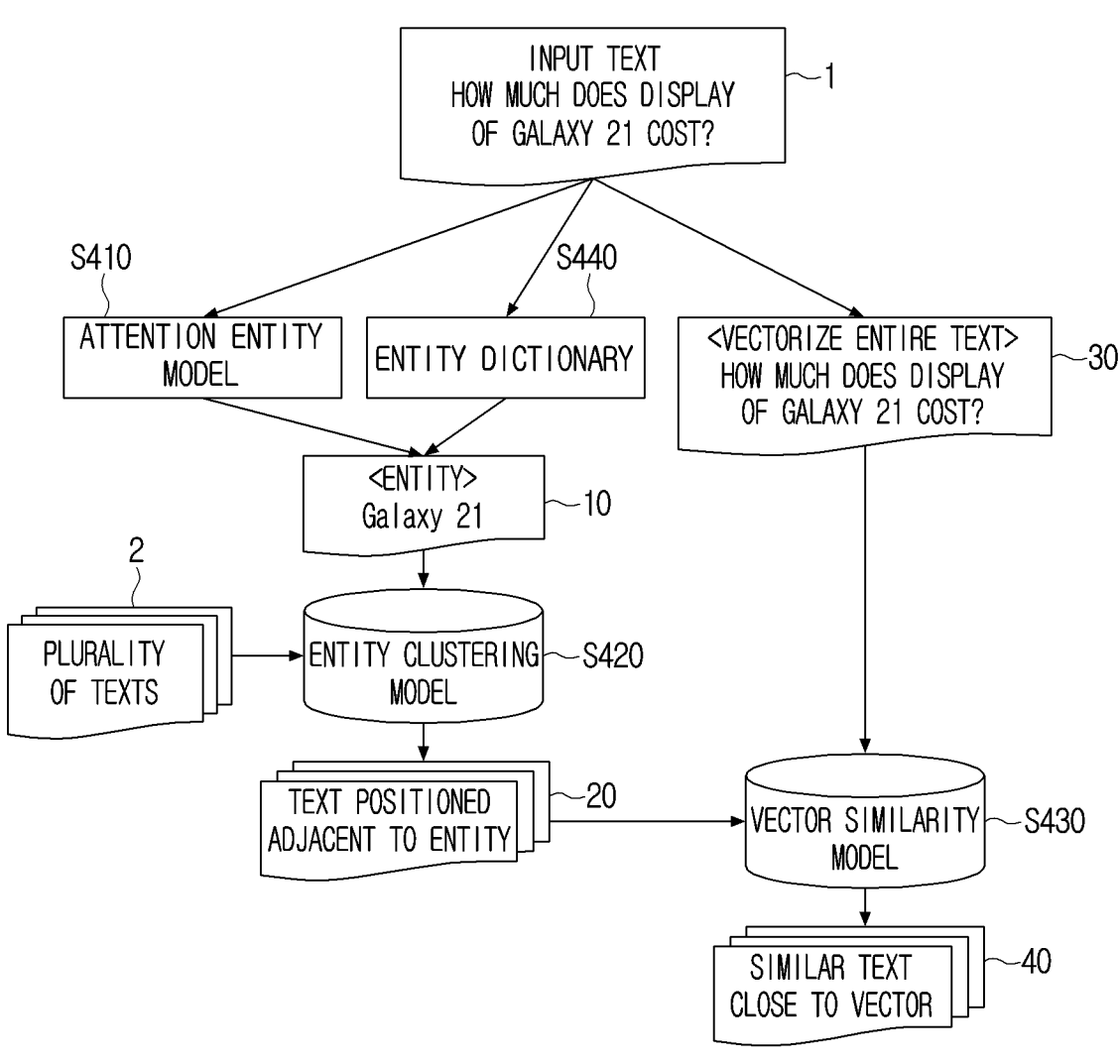
FIG. 9 is a view illustrating operations and interactions of an entity dictionary, according to another embodiment of the disclosure.

FIG. 9 is a view illustrating operations and interactions of an entity dictionary, according to another embodiment of the disclosure.

Referring to FIG. 9, in a modification of the embodiment of FIG. 4, an entity dictionary may be added (operating at S440). The entity dictionary may be an entity dictionary (or, word database (DB)) classifying important words to recognize a search intention based on a search result provision history of the electronic apparatus 100 and data received from an external device (e.g., a server).

According to an embodiment, the processor 120 may identify an entity 10 by inputting the input text 1 into the first neural network model, that is, the attention entity model (S410), and identify whether there is a matching word by comparing a plurality of words included in the input text 1 with a plurality of words included in the entity dictionary (S440). The processor 120 may input the entity 10 identified using the attention entity model, the word identified in operation S440 as an entity 10', or both, into the entity clustering model.

A method of generating or updating the entity dictionary according to an embodiment will be described with reference to FIG. 10.

Figure 10:
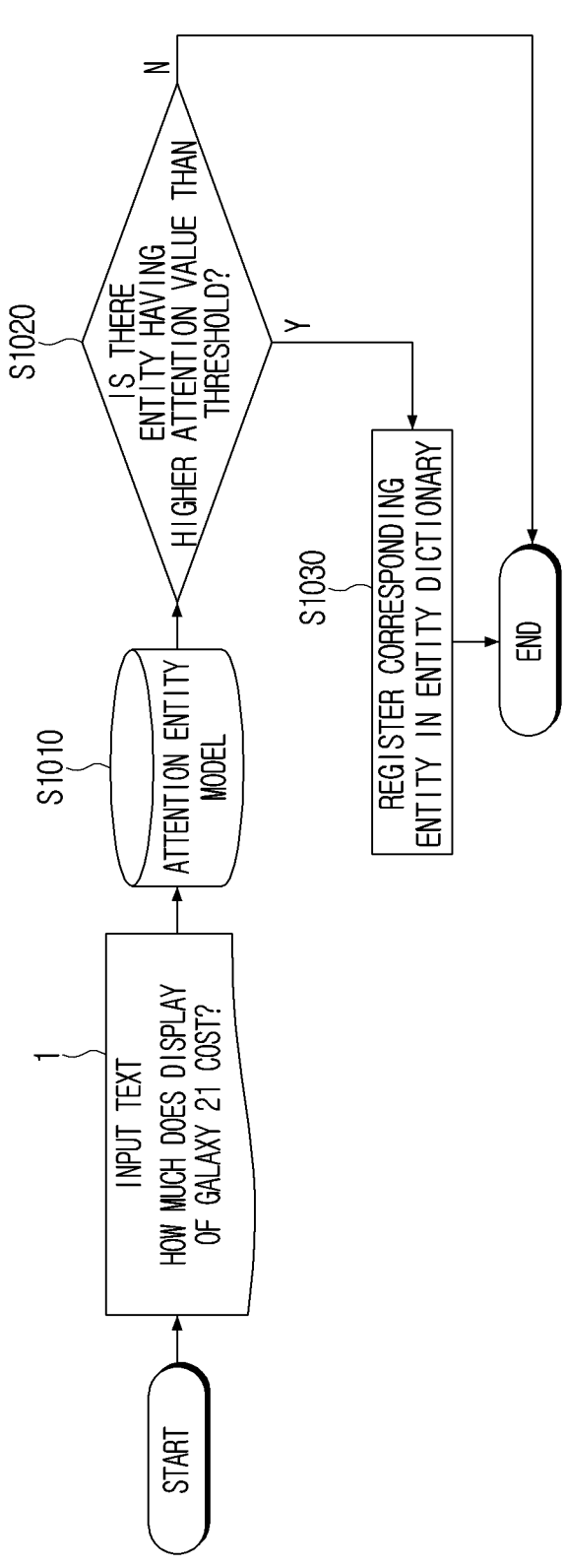
FIG. 10 is a flowchart illustrating a method of registering an entity, according to an embodiment of the disclosure.

FIG. 10 is a flowchart illustrating a method of registering an entity, according to an embodiment of the disclosure.

Referring to FIG. 10, the input text 1 may be input to the attention entity model (at S1010). The attention entity model may identify whether there is a word to which a weight higher than a threshold value is applied from among weights applied to each of the plurality of words included in the input text 1 (at S1020). For example, a total sum of the weights applied to each of the plurality of words may be 1, and the threshold value may be 0.5. However, this is only an example, and the method is not limited thereto.

The processor 120 may add (or register) a word, to which a weight higher than the threshold value is applied, to the entity dictionary (at S1030).

Because a weight higher than the threshold value indicates an important word in recognizing search intention, if a word is provided from the entity dictionary in addition to the entity acquired using the attention entity model, among a plurality of words included in a new input text 1', the processor 120 may identify the word as an entity in, for example, the operations discussed with reference to FIG. 9.

Referring back to FIG. 3, an electronic apparatus according to various exemplary embodiments may include at least one of, for example, a smartphone, tablet PC, mobile phone, video phone, e-book reader, desktop PC, laptop PC, netbook computer, workstation, server, PDA, portable multimedia player (PMP), MP3 player, medical device, camera, or a wearable device. A wearable device may include at least one of an accessory type (e.g.: watch, ring, bracelet, ankle bracelet, necklace, glasses, contact lens, or head-mounted-device (HMD)), fabric or cloth-embedded type (e.g.: e-cloth), body-attached type (e.g.: skin pad or tattoo), or bio implant circuit.

In some exemplary embodiments, an electronic apparatus may include, for example, at least one of a television, digital video disk (DVD) player, audio, refrigerator, air-conditioner, cleaner, oven, microwave, washing machine, air cleaner, set top box, home automation control panel, security control panel, media box (ex: Samsung HomeSync™, Apple TV™, or Google TV™), game console (ex: Xbox™, PlayStation™), e-dictionary, e-key, camcorder, or e-frame.

In another exemplary embodiment, an electronic apparatus may include various medical devices (e.g.: various portable medical measuring devices (blood glucose monitor, heart rate monitor, blood pressure measuring device, or body temperature measuring device, etc.), magnetic resonance angiography (MRA), magnetic resonance imaging (MM), computed tomography (CT), photographing device, or ultrasonic device, etc.), navigator, global navigation satellite system (GNSS), event data recorder (EDR), flight data recorder (FDR), vehicle info-tainment device, e-device for ships (ex: navigation device for ship, gyrocompass, etc.), avionics, security device, head unit for vehicles, industrial or home-use robots, drone, ATM of financial institutions, point of sales (POS) of shops, or internet of things device (e.g.: bulb, sensors, sprinkler, fire alarm, temperature controller, streetlight, toaster, sporting goods, hot water tank, heater, boiler, etc.).

In the disclosure, training the neural network model may mean that a basic neural network model (for example, a neural network model including an arbitrary random parameter) is trained using a plurality of training data by a learning algorithm, and thus a predefined action rule or neural network model set to perform a desired characteristic (or purpose) is generated. Such training may be performed through a separate server and/or system, but is not limited thereto, and may be performed in the electronic apparatus 100. Examples of the learning algorithm include, for example, and without limitation, supervised learning, unsupervised learning, semi-supervised learning, transfer learning or reinforcement learning, but are not limited to the examples described above.

Each of the neural network models may be implemented as, for example, a convolutional neural network (CNN), deep neural network (DNN), recurrent neural network (RNN), restricted Boltzmann machine (RBM), deep belief network (DBN), bidirectional recurrent deep neural network (BRDNN), or deep Q-networks, but is not limited to the examples described above.

The processor 120 for executing the neural network model according to an embodiment of the disclosure may be implemented through a combination of a general-purpose processor such as, for example, and without limitation, a general-purpose processor such as a CPU, AP, or a digital signal processor (DSP), a graphics-only processor such as a GPU, a vision processing unit (VPU), or an artificial intelligence-only processor such as an NPU. The processor 120 may control to process input data according to a predefined operation rule or a neural network model stored in the memory 110. Alternatively, when the processor 120 is dedicated processor (or artificial intelligence dedicated processor) the dedicated processor may be designed with a hardware structure specialized for processing a specific neural network model. For example, hardware specialized for processing a specific neural network model may be designed as a hardware chip such as an ASIC or FPGA. When the processor 120 is implemented as a dedicated processor, it may be implemented to include a memory for implementing an embodiment of the disclosure, or may be implemented to include a memory processing function for using an external memory.

According to another example, the memory may store information about a neural network model including a plurality of layers. In this configuration, storing information about the neural network model may refer to storing various information related to the operation of the neural network model, for example, information on a plurality of layers included in the neural network model, or information on parameters used in each of the plurality of layers (for example, filter coefficients, bias, etc.).

The memory 110 may store data required for various embodiments of the disclosure. The memory 110 may be implemented in the form of a memory embedded in the electronic apparatus 100' or may be implemented in the form of a memory detachable to the electronic apparatus 100' depending on a purpose of data storage.

For example, data for driving the electronic apparatus 100 may be stored in a memory embedded in the electronic apparatus 100, and data for an extended function of the electronic apparatus 100 may be stored in a memory attached to and detached from the electronic apparatus 100. Additionally, the memory embedded in the electronic apparatus 100' may be implemented as at least one of a volatile memory (e.g., dynamic RAM (DRAM), static RAM (SRAM), or synchronous dynamic RAM (SDRAM)), non-volatile memory (e.g., one time programmable ROM (OT-PROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD). Also, the memory detachable from the electronic apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to the USB port (e.g., USB memory), or the like.

According to an example, the memory 110 may store at least one instruction for controlling the electronic apparatus 100 or a computer program including the instructions.

According to another example, the memory may store information about a neural network model including a plurality of layers. In this configuration, storing information about the neural network model may refer to storing various information related to the operation of the neural network model, for example, information on a plurality of layers included in the neural network model, information on parameters used in each of the plurality of layers (for example, filter coefficients, bias, etc.). For example, the memory 110 may store a neural network model according to an embodiment of the disclosure.

The electronic apparatus 100 according to an embodiment of the disclosure may include a display (not shown), and the display (not shown) may display various screens. The display may be implemented as a display including a self-luminous element or a display including a non-light-emitting device and a backlight. For example, the display may be implemented in various types of displays such as liquid crystal display (LCD), organic light emitting diodes (OLED) displays, light emitting diodes (LED), micro LED, Mini LED, plasma display panel (PDP), quantum dot (QD) displays, quantum dot light-emitting diodes (QLEDs), or the like. In the display 150, a driving circuit, a backlight unit, or the like, which may be implemented in the form of an a-si TFT, a low temperature poly silicon (LTPS) TFT, an organic TFT (OTFT), or the like may also be included. The display 150 may also be implemented as a touch screen combined with a touch sensor, a flexible display, a rollable display, a three-dimensional (3D) display, a display in which a plurality of display modules are physically connected, or the like.

Particularly, the display according to an embodiment of the disclosure may output the text identified under the control of the processor 120, or text that has a mapping relation with the identified text and belongs to an answer category.

FIG. 11 is a flowchart illustrating a method of controlling an electronic apparatus according to an embodiment of the disclosure.

A method of controlling an electronic apparatus storing a plurality of texts, according to an embodiment of the disclosure, may identify a first entity among words included in the input text by inputting an input text into the first neural network model (at S1110).

The identified first entity may be inputted to the second neural network model to position the identified first entity on a first vector space, thereby acquiring at least one text, among a plurality of texts, which is positioned adjacent to the identified first entity on the first vector space (at S1120).

When at least one text, among the acquired texts, which is positioned adjacent to the input text on a second vector space is identified, a search result based on the identified text may be output (at S1130).

Each of the plurality of searchable texts may correspond to a respective second entity of a plurality of second entities, and each of the plurality of second entities may be positioned on the first vector space. The operation S1120 of acquiring at least one text positioned adjacent to the first entity may include identifying at least one second entity which is positioned adjacent to the first entity on the first vector space, and acquiring each text corresponding to the identified at least one second entity.

The identifying of the at least one second entity may include comparing, on the first vector space, a position of the first entity with at least one position respectively corresponding to at least one of the plurality of second entities.

The operation S1130 may include identifying the at least one acquired text positioned adjacent to the input text by comparing, on the second vector space, a position of the input text with at least one position respectively corresponding to at least one of the plurality of texts.

The first neural network model according to an embodiment of the disclosure may apply different weights to each of the words included in the training text, such that at least one word having a largest weight, relative to weights of other words included in the training text, is thereby labeled as an entity corresponding to the training text.

When a first training text belonging to a question category is configured to have a mapping relation with a third training text belonging to an answer category, and when a second training text belonging to the question category is configured to have a mapping relation with a fourth training text belonging to the answer category, the first neutral network model may apply weights by comparing the first training text and the second training text, to thereby identify a first word included in the first training text and a second word included in the second training text having different meanings. Additionally, based on the third training text and the fourth training text being identified as having different meanings, the first neutral network may apply a larger weight to the first word relative to weights applied to other words included in the first training text, and apply a larger weight to the second word relative to weights applied to other words included in the second training text.

A control method according to an embodiment of the disclosure includes positioning an input text on the second vector space by inputting the input text into a third neural network model and positioning the input text on a second vector space. The third neural network model may convert the input text to a vector in whole text units. The third neural network model may be a model trained to identify a position on the second vector space corresponding to the text.

The input text and each of the plurality of texts according to an embodiment of the disclosure may be a text in the form of a sentence included in at least one of a question category and an answer category, and each of the texts included in the question category among the plurality of texts may have a mapping relation with a corresponding text included in the answer category.

When the input text is included in the question category, the operation S1120 may include acquiring at least one text included in the question category and positioned adjacent to the identified first entity on the first vector space, and when at least one text positioned adjacent to the input text on a second vector space among the acquired texts is identified, outputting a text included in the answer category and having a mapping relation with the identified text.

However, various embodiments of the disclosure may be applied to all types of electronic apparatuses capable of receiving a voice signal as well as electronic apparatuses.

Various example embodiments described above may be embodied in a recording medium that may be read by a computer or a similar apparatus to the computer using software, hardware, or a combination thereof. In some cases, the embodiments described herein may be implemented by the processor itself. In a software configuration, various embodiments described in the specification such as a procedure and a function may be implemented as separate software modules. The software modules may respectively perform one or more functions and operations described in the disclosure.

According to various embodiments described above, computer instructions for performing processing operations of the electronic apparatus 100 according to the various embodiments described above may be stored in a non-transitory computer-readable medium. The computer instructions stored in the non-transitory computer-readable medium may cause a particular device to perform processing operations on the sound output device according to the various embodiments described above when executed by the processor of the particular device.

The non-transitory computer readable recording medium may refer, for example, to a medium that stores data and that can be read by devices. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus for performing a search, the electronic apparatus comprising:

memory configured to store a plurality of searchable texts and a plurality of neural network models, the plurality of neural network models including a first neural network model and a second neural network model; and at least one processor configured to:

identify a first entity among words included in input text by inputting the input text into the first neural network model;

position the identified first entity on a first vector space by inputting the identified first entity into the second neural network model;

convert the input text into an input vector and position the input vector on a second vector space that is different from the first vector space by inputting the input text into a third neural network model, wherein the third neural network model is configured to be trained to position the input text on the second vector space by converting the input text to the input vector;

acquire at least one text, among the plurality of searchable texts, which is positioned adjacent to the identified first entity on the first vector space, wherein a number of the acquired at least one text is less than a number of the plurality of searchable texts;

convert the acquired at least one text into at least one text vector and position the at least one text vector on the second vector space by inputting the at least one acquired text into the third neural network model;

compare, on the second vector space, the at least one text vector and the input vector;

identify at least one text, among the at least one acquired text, which is positioned adjacent to the input text on the second vector space, by acquiring at least one identifying vector positioned adjacent to the input vector, the identified at least one text corresponding to the acquired at least one identifying vector; and output a search result based on the identified at least one text, wherein the first neural network model is configured, when a first training text belonging to a question category is configured to have a mapping relation with a third training text belonging to an answer category, and when a second training text belonging to the question category is configured to have a mapping relation with a fourth training text belonging to the answer category, to apply weights by comparing the first training text and the second training text to thereby identify a first word included in the first training text and a second word included in the second training text having different meanings, and based on the third training text and the fourth training text being identified as having different meanings, applying a larger weight to the first word relative to weights applied to other words included in the first training text, and apply a larger weight to the second word relative to weights applied to other words included in the second training text.

2. The electronic apparatus of claim 1, wherein each of the plurality of searchable texts corresponds to a respective second entity of a plurality of second entities, each of the plurality of second entities being positioned on the first vector space, and wherein the at least one processor is configured to acquire the at least one text among the plurality of searchable texts by:

identifying at least one second entity which is positioned adjacent to the first entity on the first vector space; and acquiring each searchable text corresponding to the identified at least one second entity.

3. The electronic apparatus of claim 2, wherein the at least one processor is configured to identify the at least one second entity positioned adjacent to the first entity by comparing, on the first vector space, a position of the first entity with at least one position respectively corresponding to at least one of the plurality of second entities.

4. The electronic apparatus of claim 1, wherein the at least one processor is configured to identify the acquired at least one text positioned adjacent to the input text by comparing, on the second vector space, a position of the input text with at least one position respectively corresponding to at least one of the plurality of searchable texts.

5. The electronic apparatus of claim 1, wherein the first neural network model is configured to apply a different weight to each word included in a training text, at least one word having a largest weight, relative to weights of other words included in the training text, being thereby labeled as an entity corresponding to the training text.

6. The electronic apparatus of claim 1, wherein the input text and each of the plurality of searchable texts are each configured to be text in a form of a sentence included in at least one of a question category or an answer category, and wherein each text included in the question category among the plurality of searchable texts is configured to have a mapping relation with a corresponding text included in the answer category among the plurality of searchable texts.

7. The electronic apparatus of claim 6, wherein the at least one processor is configured, when the input text is included in the question category, to acquire the at least one text by acquiring at least one searchable text included in the question category and positioned adjacent to the identified first entity on the first vector space, and wherein the at least one processor is configured, when the input text is included in the question category, to output the search result based on at least one searchable text included in the answer category and having a mapping relation with the identified at least one text.

8. A method of controlling an electronic apparatus for performing a search, the electronic apparatus including a plurality of texts, the method comprising:

identifying a first entity among words included in input text by inputting the input text into a first neural network model;

positioning the identified first entity on a first vector space by inputting the identified first entity into a second neural network model;

converting the input text into an input vector and position the input vector on a second vector space that is different from the first vector space by inputting the input text into a third neural network model, wherein the third neural network model is configured to be trained to position the input text on the second vector space by converting the input text to the input vector;

acquiring at least one text, among a plurality of searchable texts, which is positioned adjacent to the identified first entity on the first vector space, wherein a number of the acquired at least one text is less than a number of the plurality of searchable texts;

converting the acquired at least one text into at least one text vector and positioning the at least one text vector on the second vector space by inputting the at least one acquired text into the third neural network model;

comparing, on the second vector space, the at least one text vector and the input vector;

identifying at least one text, among the at least one acquired text, which is positioned adjacent to the input text on the second vector space, by acquiring at least one identifying vector positioned adjacent to the input vector, the identified at least one text corresponding to the acquired at least one identifying vector; and outputting a search result based on the identified at least one text, wherein the first neural network model is configured, when a first training text belonging to a question category is configured to have a mapping relation with a third training text belonging to an answer category, and when a second training text belonging to the question category is configured to have a mapping relation with a fourth training text belonging to the answer category, to apply weights by comparing the first training text and the second training text belonging to a question category and identify a first word included in a first training text and a second word included in a second training text having different meanings, and based on the third training text and the fourth training text being identified as having different meanings, applying a larger weight to the first word relative to weights applied to other words included in the first training text, and apply a larger weight to the second word relative to weights applied to other words included in the second training text.

9. The method of claim 8, wherein each of the plurality of searchable texts corresponds to a respective second entity of a plurality of second entities, each of the plurality of second entities being positioned on the first vector space, and wherein the acquiring of the at least one text among the plurality of searchable texts includes:

identifying at least one second entity which is positioned adjacent to the first entity on the first vector space; and acquiring each searchable text corresponding to the identified at least one second entity.

10. The method of claim 9, wherein the identifying of the at least one second entity positioned adjacent to the first entity includes comparing, on the first vector space, a position of the first entity with at least one position respectively corresponding to at least one of the plurality of second entities.

11. The method of claim 8, wherein the identifying of the acquired at least one text positioned adjacent to the input text includes comparing, on the second vector space, a position of the input text with at least one position corresponding to each of the plurality of searchable texts.

12. The method of claim 8, wherein the first neural network model is configured to apply a different weight to each word included in training text, at least one word having a largest weight, relative to weights of other words included in the training text, being thereby labeled as an entity corresponding to the training text.

13. The method of claim 8, wherein the input text and each of the plurality of searchable texts are each configured to be text in a form of a sentence included in at least one of a question category or an answer category, and wherein each text included in the question category among the plurality of searchable texts is configured to have a mapping relation with a corresponding text included in the answer category among the plurality of searchable texts.

14. The method of claim 13, wherein the acquiring further comprises, when the input text is included in the question category, acquiring the at least one text by acquiring at least one searchable text included in the question category and positioned adjacent to the identified first entity on the first vector space, and wherein the outputting further comprises, when the input text is included in the question category, outputting the search result based on at least one searchable text included in the answer category and having a mapping relation with the identified at least one text.

* * * * *